(12) United States Patent  
Maddah-Ali

(10) Patent No.: US 9,054,920 B2  
(45) Date of Patent: Jun. 9, 2015

(54) MANAGING DATA FILE TRANSMISSION

(75) Inventor: Mohammadali Maddah-Ali, Piscataway, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 239 days.

(21) Appl. No.: 13/077,420

(22) Filed: Mar. 31, 2011

(65) Prior Publication Data

US 2012/0254459 A1 Oct. 4, 2012

(51) Int. Cl.
| | |
|---|---|
| *H04L 29/08* | (2006.01) |
| *H04N 21/2225* | (2011.01) |
| *H04N 21/433* | (2011.01) |
| *H04N 21/472* | (2011.01) |
| *H04N 21/63* | (2011.01) |
| *H04N 21/845* | (2011.01) |

(52) U.S. Cl.
CPC ........ *H04L 29/08729* (2013.01); *H04L 67/104* (2013.01); *H04L 67/1091* (2013.01); *H04N 21/2225* (2013.01); *H04N 21/4331* (2013.01); *H04N 21/47202* (2013.01); *H04N 21/632* (2013.01); *H04N 21/8456* (2013.01); *H04L 67/06* (2013.01); *H04L 67/2847* (2013.01); *H04L 67/2828* (2013.01)

(58) Field of Classification Search
CPC ....... H04L 47/10; H04L 47/36; H04L 67/104; H04L 67/06; H04L 67/2823; H04L 67/2828; H04L 69/04
USPC ......... 709/203, 213, 227, 231, 232, 236, 246, 709/247
See application file for complete search history.

(56) References Cited

U.S. PATENT DOCUMENTS

| | | | | |
|---|---|---|---|---|
| 6,816,872 | B1 * | 11/2004 | Squibb | 1/1 |
| 2001/0007989 | A1 * | 7/2001 | Mittal et al. | 707/200 |
| 2002/0107969 | A1 * | 8/2002 | Waldvogel et al. | 709/231 |
| 2007/0255844 | A1 | 11/2007 | Shen et al. | |
| 2008/0005347 | A1 * | 1/2008 | Ott | 709/231 |
| 2008/0016289 | A1 * | 1/2008 | Pennock et al. | 711/148 |

(Continued)

FOREIGN PATENT DOCUMENTS

JP 2001337860 A 12/2001

OTHER PUBLICATIONS

International Search Report for PCT/US2011/030090 mailed Jul. 27, 2012 (3 pages).

(Continued)

*Primary Examiner* — Barbara Burgess  
(74) *Attorney, Agent, or Firm* — Fay Sharpe LLP

(57) ABSTRACT

In a method for managing transmission of data files to users, a first file is divided into first segments and a second file is divided into second segments. A first segment is sent to a first user and a different first segment is sent to a second user. A second segment is sent to the first user and a different second segment is sent to the second user. At least part of a segment sent to the first user is combined with at least part of a segment sent to the second user to produce a combined segment which is of smaller size than the total size of the at least parts of segments before combining. The combined segment is transmitted to the first user and to the second user for each user to recover a segment using the combined segment and at least part of a segment.

21 Claims, 3 Drawing Sheets

(56) References Cited

U.S. PATENT DOCUMENTS

| | | | |
|---|---|---|---|
| 2008/0263057 A1* | 10/2008 | Thompson | 707/10 |
| 2009/0222509 A1 | 9/2009 | King et al. | |
| 2010/0185778 A1* | 7/2010 | Weigand et al. | 709/231 |
| 2011/0026608 A1* | 2/2011 | Luthra | 375/240.26 |
| 2011/0067115 A1* | 3/2011 | Cappio et al. | 726/29 |
| 2011/0255609 A1* | 10/2011 | Lynch et al. | 375/240.26 |

OTHER PUBLICATIONS

Written Opinion for PCT/US2011/030090 mailed Jul. 27, 2012 (7 pages).

English Bibliography for Japanese Patent Publication No. JP2001337860A, published Dec. 7, 2001, printed from Thomson Innovation on Jan. 15, 2015, 3 pages.

* cited by examiner

MANAGING DATA FILE TRANSMISSION

FIELD OF THE INVENTION

The present invention relates to a method and apparatus for managing transmission of data files to users, and more particularly, but not exclusively, to transmission of data files to be cache locally to a user.

BACKGROUND

A server may hold data files to be sent to a user over a network, which may be, for example, the Internet or some other network. The data files may be media content files, or of some other type, and sent to the user when the user requests them, or when the content creator or provider wants to distribute them, for example. If a user does not require immediate access to a data file, or wishes to keep it available for later access, the data file may be stored in a cache memory local to the user. For example, the cache memory may be a hard drive included in the user equipment or the cache memory may be separately provided and arranged to be readily accessible by the user, for example, by being located nearer the edge of a network than the server. When the user needs a cached file, it may be obtained from the cache memory with reduced or no network resources.

Data transmission may be efficiently managed by sending data files to be cached at times when network resources are at high capacity and/or low cost. For example, a data file may be sent if a WiFi network is available, or when the user is in a low-traffic area or it is a low-traffic time period.

BRIEF SUMMARY

According to a first aspect of the invention, in a method for managing transmission of data files to users, a first file is divided into a plurality of first segments and a second file is divided into a plurality of second segments. A first segment is sent to a first user and a different first segment is sent to a second user. A second segment is sent to the first user and a different second segment is sent to the second user. At least part of a segment sent to the first user is combined with at least part of a segment sent to the second user to produce a combined segment which is of smaller size than the total size of the at least parts of segments before combining. The combined segment is transmitted to the first user and to the second user for each user to recover a segment using the combined segment and at least part of a segment.

The smaller size of the combined segment compared to the total size of the at least parts of segments before combining means that the combined segment requires less space if it is to be cached in a cache, or caches, local to the users. Additionally, as the combined segment is of smaller size, it requires fewer network resources for transmission than if the segments were to be sent individually in uncombined form. This is advantageous even for arrangements in which segments are not cached at a memory cache or caches local to a user.

The user or users may be any node in a network. For example, in a wireless network, a user could be a router or an end user or some other network node.

A method in accordance with the invention may be applied to wireless, fixed line or other types of network and is not limited to one particular technology type.

A method in accordance with the invention may be applied where there are f files and K users, and includes partitioning each file into 2 to the power of K segments, where for each subset of users, there is a segment which is saved on all of the users in that subset.

In one embodiment, the first and second segments sent to the first user may be cached a first cache memory local to the first user. Similarly, the first and second segments sent to the second user may be cached at a second cache memory local to the second user. Thus, a cache memory may be arranged to store only part of the first file and part of the second file, which may be advantageous when the cache memory is of insufficient size to store the complete files. When at a later time, one or both of the users want to access the first file or the second file, the entire file need not be sent to them as they already have access to some segments locally. Thus, even though remaining segments may in some cases need to be sent at a relatively expensive time, or during high network loads, as the entire file need not be sent then, overall costs for sending the file may be reduced. Additionally, the combined segment is smaller than the total size of the contributing segments, which may provide efficient file transmission management.

In an embodiment, the at least part of a segment sent to the first user is combined with at least part of a segment sent to the second user by using addition in a finite field. In one embodiment, the finite field is the binary field.

In one method, the first and second segments sent to the first and second users are sent prior to the combined segment being sent to the first and second users. However, in another embodiment, the data is sent in a different order.

In one embodiment, a segment is divided into first and second parts, the first part is incorporated into the combined segment and the second part transmitted to the first and second users. The second part may be transmitted at the same time as the combined segment or as a separate transmission.

According to a second aspect of the invention, a data transmission manager for managing transmission of data files to users comprises: a divider for dividing a first file into a plurality of first segments and for dividing a second file into a plurality of second segments; transmitter apparatus for sending a first segment to a first user and a different first segment to a second user, and for sending a second segment to the first user and a different second segment to the second user; a combiner for combining at least part of a segment sent to the first user with at least part of a segment sent to the second user to produce a combined segment which is of smaller size than the total size of the at least parts of segments before combining; and said transmitter apparatus being operative to send the combined segment to the first user and to the second user for each of the first and second users to recover a segment using the combined segment and at least part of a segment.

BRIEF DESCRIPTION OF THE DRAWINGS

Some embodiments of the present invention will now be described by way of example only, and with reference to the accompanying drawings, in which.

DETAILED DESCRIPTION

In a first embodiment, assume that there is a first file A and a second file B available from a server, each file being 1 MB in size. There are first user U1 and second user U2, and each user has an associated local cache memory M1 and M2 respectively, M1 and M2 being 1 MB each. It is assumed that the history of these two users U1 and U2 shows that each may require file A and file B with equal probability.

In this caching scheme, it is necessary to broadcast on average 0.5 MB in expensive networks. Moreover, the peak rate is 0.5 MB.

Figure 1:
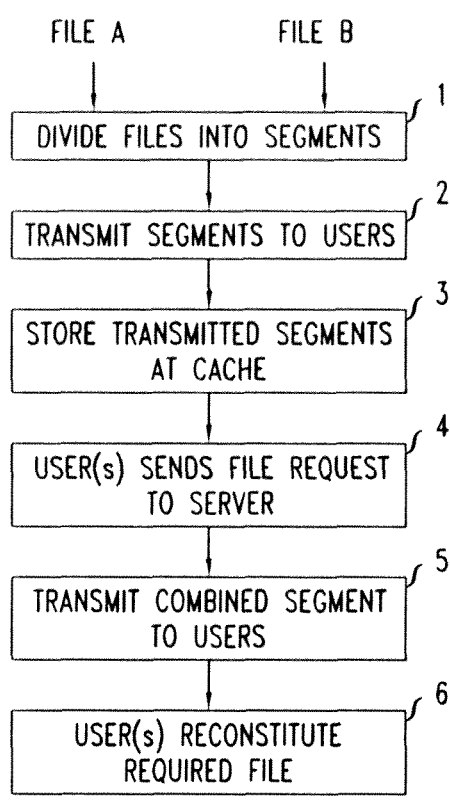
FIG. 1 schematically illustrates a flowchart of a method in accordance with the invention.

With reference to FIG. 1, at 1, the first and second files are divided into several segments. File A is divided into two equal size segments A1 and A2, where each segment is 0.5 MB, such that A=(A1, A2).

Similarly, file B is divided into two equal size segments B1 and B2, where each segment is 0.5 MB, and B=(B1, B2).

At 2, segments A1 and B1 are transmitted to the first user U1 and, at 3, saved on the associated cache memory M1. Also, A2 and B2 are transmitted to the second user U2 and saved on the associated cache memory M2. The caching strategy is summarized in Table 1 and the probability in Table 2.

TABLE 1

Caching Table

| User One | A1, B1 |
|----------|--------|
| User Two | A2, B2 |

TABLE 2

| Probability Table | File A | File B |
|-------------------|--------|--------|
| User One | p1A = 0.5 | p1B = 0.5 |
| User Two | p2A = 0.5 | p2B = 0.5 |

Thus, each user has part of each file.

At a later time, for example, if the first user U1 wants to access file A and the second user U2 requires file B, neither has sufficient segments cached to provide a complete file. The users transmit their requirements to the server at 4.

At 5, the server arranges for the transmitter to broadcast a combined segment A2+B1, where + indicates summation in a finite field to generate the combined segment. In this example, combination is carried out in the binary field and therefore + is simply bit-wise XOR operation. The combined segment A2+B1 has 0.5 MB size. This compares with a size of 0.5 MB for segment A2 and 0.5 MB for segment B1, that is, 1 MB in total.

In the next stage, shown at 6, the first user U1 receives A2+B1 and already has B1 in its cache memory M1. Thus, the first user U1 can recover A2 by the operation (A2+B1)−B1. The first user U1 also has A1 in it cache memory M1. Therefore, the first user U1 has both A1 and A2 and is able to reconstitute the required file A.

The second user U2 also receives A2+B1 broadcast by the transmitter. The second user U2 already has A2 in its cache memory, and therefore can recover B1 by the operation (A2+B1)−A2. The second user U2 already has B2 in it cache memory M2. Therefore, both B1 and B2 are available to the second user U2 to reconstitute the file B it requires.

In another scenario, assuming that the starting point is that shown in Table 1, assume that the first and second users both require file A. In this case, the transmitter broadcasts A2+A1, where + again indicates combination is carried out in the binary field and is a bit-wise XOR operation. The combined segment A2+A1 has a size of 0.5 MB compared to a size of 0.5 MB for segment A2 and 0.5 MB for segment A1, that is, 1 MB in total The first user U1 thus receives A2+A1 and already has A1 in its cache memory. Therefore it can recover A2 by (A2+A1)−A1. Therefore, the first user U1 has both segments A1 and A2 and can thus reconstitute file A.

The second user U2 also receives the broadcast A2+A1 and already has A2 in its cache memory M2. Therefore it can recover A1 by (A2+A1)−A2. Therefore, it will have both A1 and A2 and can thus reconstitute file A.

For other cases, the broadcasting strategy and also the recovery method are shown in Table 3 below. It can be seen that no matter which file each user requests, the transmitter needs to broadcast only 0.5 MB. Therefore, the average rate of data that the transmitter broadcasts is 0.5 MB.

TABLE 3

| Demand | Modified Requirements Due to Caching | Transmitter Sends | Decoding Strategy |
|--------|--------------------------------------|-------------------|-------------------|
| User One Wants A | User One Wants A2 | A2 + B1 | User One: (A2 + B1) − B1 |
| User Two Wants B | User Two Wants B1 |  | User Two: (A2 + B1) − B2 |
| User One Wants B | User One Wants B2 | A1 + B2 | User One: (A1 + B2) − A1 |
| User Two Wants A | User Two Wants A1 |  | User Two: (A1 + B2) − B1 |
| User One Wants A | User One Wants A2 | A1 + A2 | User One: (A1 + A2) − A1 |
| User Two Wants A | User Two Wants A1 |  | User Two: (A1 + A2) − A2 |
| User One Wants B | User One Wants B2 | B1 + B2 | User One: (B1 + B2) − B1 |
| User Two Wants B | User Two Wants A1 |  | User Two: (B1 + B2) − B2 |

In this embodiment, the caching scheme is optimized and the average load or maximum load of the network is minimized. In the simple example given above, the caching scheme can reduce the average load up to 50% and peak load of 100%.

Figure 2:
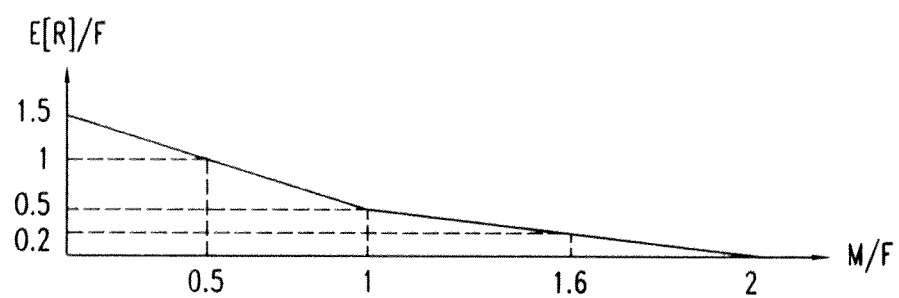
FIG. 2 is a schematic graph illustrating transmission.

FIG. 2 illustrates the normalized average transmission rate against the normalized cache-memory size for two files, of size F, and two users, each with cache size M. In addition, the probability that each user may need one of the files is equally likely.

In another embodiment, it is assumed that there are first and second users User 1 and User 2 with available caching memory size of $M_1$ and $M_2$ respectively. In addition, assume that the server has two files A and B with sizes $F_A$ and $F_B$ respectively, i.e.

$|A|=F_A$ $|B|=F_B$.

The users may need one of the files with some probabilities listed in the following Table 4:

TABLE 4

| User 1 wants | A | A | B | B |
|---|---|---|---|---|
| User 2 wants | A | B | A | B |
| Probability | $p_{AA}$ | $p_{AB}$ | $p_{BA}$ | $p_{BB}$ |

Each file is divided into 5 parts, which need not be equal, to give:

$$A=\{A_0,A_1,A_2,A_{12}\}$$

$$B=\{B_0,B_1,B_2,B_{12}\}$$

with sizes $$|A_0|=x_0, |A_1|=x_1, |A_2|=x_2, |A_{12}|=x_{12},$$

$$|B_0|=y_0, |B_1|=y_1, |B_2|=y_2, |B_{12}|=y_{12},$$

Therefore, $$x_0+x_1+x_2+x_{12}=F_A$$

$$y_0+y_1+y_2+y_{12}=F_B$$

Parts of the files denoted by $A_1$ and $B_1$ are cached on User 1 memory.

Parts of the files denoted by $A_2$ and $B_2$ are cached on User 2 memory.

Parts of the files denoted by $A_{12}$ and $B_{12}$ are cached on both users' memories.

Parts of the files denoted by $A_0$ and $B_0$ are cached on none of the memories, Therefore, $$x_1+y_1+x_{12}+y_{12}<=M_1$$

$$x_2+y_2+x_{12}+y_{12}<=M_2$$

In a first scenario, User 1 asks for file A and User 2 asks for file B. Thus, User 1 requires $A_0$ which is only available at the server
User 2 requires $B_0$ which is only available at the server
User 1 already has $A_1$ and $A_{12}$.
User 2 already has $B_1$ and $B_{12}$
User 1 wants $A_2$ while User 2 has it on its caching memory
User 2 wants $B_1$ while User 1 has it on its caching memory
Therefore the server must send both $A_0$ and $B_0$ to Users 1 and 2.

Assuming that $|A_2|>|B_1|$, then the server partitions segment $A_2$ into two parts, denoted by $A_{2U}$ and $A_{2L}$, i.e. $A_2=\{A_{2U}, A_{2L}\}$, where $|A_{2U}|=|B_1|$. Then the server sends combined segment $A_{2U}+B_1$, where + is addition in binary field or any other finite field, and also sends $A_{2L}$. Note that:

$$|A_{2U}+B_1| \text{ plus } |A_{2L}|=|A_2|=\max\{|A_2|,|B_1|\}$$

where max $\{|A_2|,|B_1|\}$ is the maximum of the size of $A_2$ and the size of $B_1$.

Then user 1 can use $A_{2U}+B_1$, $A_{2L}$, and $B_1$ to recover $A_2=\{A_{2U}, A_{2L}\}$. Also user 2 can use $A_{2U}+B_1$ and $A_2$ to recover $B_1$.

On other hand, if $|A_2|<|B_1|$, then the server divides segment $B_1$ into two parts, denoted by $B_{1U}$ and $B_{1L}$, i.e. $B_1=\{B_{1U}, B_{1L}\}$, where $|B_{1U}|=|A_2|$. Then the server sends combined segment $B_{1U}+A_2$ and also sends $B_{1L}$ and again + is addition in binary field any other finite fields. Note that $$|B_{1U}+A_2| \text{ plus } |B_{1L}|=|B_1|=\max\{|A_2|,|B_1|\}.$$

Then user 2 can use $B_{1U}+A_1$, $B_{1L}$, $A_2$, to recover $B_1=\{B_{1U}, B_{1L}\}$. Also User 1 can use $B_{1U}+A_2$, and $B_1$ to recover $A_2$.

Then each user has the necessary segments to reconstitute the file requested by it.

In a second scenario, User 1 and User 2 both request file A. Note:

Users 1 and 2 want $A_0$ which is only available at the server memory
Both Users 1 and 2 already have $A_{12}$.
User 1 wants $A_2$ while User 2 has it on its caching memory
User 2 wants $A_1$ while User 1 has it on its caching memory
Therefore the server has to sends $A_0$ to users 1 and 2.

Assume that $|A_2|>|A_1|$, then the server partitions segment $A_2$ into two parts, denoted by $A_{2U}$ and $A_{2L}$, i.e. $A_2=\{A_{2U}, A_{2L}\}$, where $|A_{2U}|=|A_1|$. Then the server sends combined segment $A_{2U}+A_1$ and $A_{2L}$ where + is addition in binary field or any other finite fields. Note that $$|A_{2U}+A_1|+|A_{2L}|=|A_2|=\max\{|A_2|,|A_1|\}.$$

Then User 1 can use $A_{2U}+A_1$, $A_{2L}$, and $A_1$ to recover $A_2=\{A_{2U}, A_{2L}\}$. Also User 2 can use $A_{2U}+A_1$ and $A_2$ to recover $A_1$.

On other hand if $|A_2|<|A_1|$, then the server partitions $A_1$ into two parts, denoted by $A_{1U}$ and $A_{1L}$, i.e. $A_1=\{A_{1U}, A_{1L}\}$, where $|A_{1U}|=|A_2|$. Then the server sends $A_{1U}+A_2$ and $A_{1L}$ where + is addition in binary field or any other finite fields. Note that $$|A_{1U}+A_2|+|A_{1L}|=|B_1|=\max\{|A_2|,|B_1|\}.$$

Then User 2 uses $A_{1U}+A_1$, $A_{1L}$, and $A_2$ to recover $A_1=\{A_{1U}, A_{1L}\}$. Also User 1 can use $A_{1U}+A_2$, and $A_1$ to recover $A_2$.

Following this strategy, the rate required for different cases is illustrated in Table 5 below:

TABLE 5

| User 1 wants | A | A | B | B |
|---|---|---|---|---|
| User 2 wants | A | B | A | B |
| Probability | $p_{AA}$ | $p_{AB}$ | $p_{BA}$ | $p_{BB}$ |
| Required Rate | $x_0+$ $\max\{x_1,x_2\}$ | $x_0+y_0+$ $\max\{x_2,y_1\}$ | $x_0+y_0+$ $\max\{x_1,y_2\}$ | $y_0+$ $\max\{y_1,y_2\}$ |

Therefore, the average rate is equal to:

$$p_{AA}(x_0+\max\{x_1,x_2\})+p_{AB}(x_0+y_0+\max\{x_2,y_1\})+p_{BA}(x_0+y_0+\max\{x_1,y_2\})+p_{BB}(y_0+\max\{y_1,y_2\})$$

Therefore, $x_0, x_1, x_2, x_{12}, y_0, y_1, y_2,$ and $Y_{12}$ may be chosen to minimize the average rate:

$$\text{Min } p_{AA}(x_0+\max\{x_1,x_2\})+p_{AB}(x_0+y_0+\max\{x_2,y_1\})+p_{BA}(x_0+y_0+\max\{x_1,y_2\})+p_{BB}(y_0+\max\{y_1,y_2\})$$

Subject to:

$$x_0+x_1+x_2+x_{12}=F_A$$

$$y_0+y_1+y_2+y_{12}=F_B$$

$$x_1+y_1+x_{12}+y_{12}<=M_1$$

$$x_2+y_2+x_{12}+y_{12}<=M_2$$

$$x_0,x_1,x_2,x_{12},y_0,y_1,y_2, \text{ and } y_{12} => 0$$

If the maximum rate is the main concern, the following optimization can be used:

$$\text{MinMax}[p_{AA}(x_0+\max\{x_1,x_2\}),p_{AB}(x_0+y_0+\max\{x_2,y_1\}),p_{BA}(x_0+y_0+\max\{x_1,y_2\}),p_{BB}(y_0+\max\{y_1,y_2\})]$$

Subject to $$x_0+x_1+x_2+x_{12}=F_A$$

$$y_0+y_1+y_2+y_{12}=F_B$$

$$x_1+y_1+x_{12}+y_{12}<=M_1$$

$$x_2+y_2+x_{12}+y_{12}<=M_2$$

$$x_0,x_1,x_2,x_{12},y_0,y_1,y_2, \text{ and } y_{12}=>0$$

Other aspects may be used to refine the method. For example, if caching has some costs, the corresponding cost may be added to the objective function of the optimization of the data rate. For example, if sending data to both users has different costs than sending data to one user, the objective function may be correspondingly modified. Also, if one user already has some parts of the files, then this may be exploited in the optimization. Also, users may have some priorities on segments of a file which should be cached on their memory. Such priorities may be taken into account in the optimization. For transmission of data to the users, users priorities may be considered. For example, files may be transmitted in a manner that allows a user to recover its file in a specific order.

The method can be extended to any number of files and any number of users. For example, assume that there are three users, user 1, user 2, and user 3, and three files A, B, and C.

Each file is partitioned into 8 segments as follows:

$$A=\{A_0,A_1,A_2,A_3,A_{12},A_{13},A_{23},A_{123}\}$$

$$B=\{B_0,B_1,B_2,B_3,B_{12},B_{13},B_{23},B_{123}\}$$

$$C=\{C_0,C_1,C_2,C_3,C_{12},C_{13},C_{23},C_{123}\}$$

Then the segments are saved as follows:
Segments $X_0$ at none of the users, for X=A, B, C
Segments $X_i$ at user i, for i=1, 2, 3, and X=A, B, C
Segments $X_{ij}$ at both users i and j for i,j=1, 2, 3, and X=A, B, C
Segments $X_{123}$ at all users i and X=A, B, C For simplicity, it is assumed in this example that Segments $X_i$ for i=1, 2, 3, and X=A, B, C have the same size, and also $X_{ij}$ for i,j=1, 2, 3, and X=A, B, C have the same size. This assumption is just for this example, and is not general requirement.

Then, if for example, user 1 wants A, user wants B, and user 3 wants C, then the transmitter sends $$A_0$$

$$B_0$$

$$C_0$$

$$A_2+B_1$$

$$A_3+C_1$$

$$B_3+C_2$$

$$A_{23}+B_{13}+C_{12}$$

Then each user has received enough segments and combined segments to retrieve the desired file.

If for example all users want A, then the transmitter sends $$A_0$$

$$e_1A_1+e_2A_2+e_3A_3$$

$$g_1A_1+g_2A_2+g_3A_3$$

$$q_1A_{12}+q_2A_{13}+q_3A_{23}$$

where the operations are any large enough finite-field, and $e_k$, $g_j$, $q_i$ are from the same field. Then each user has enough equations to solve for entire A.

The size of the segments can be optimized as explained above. The size of the files does not need to be the same.

If there are f files and K users, then each file is partitioned into 2 to the power of K segments, where for each subset of users, there is a segment which is saved on all of the users in that subset. The size of the some of these segments may be zero.

Figure 3:
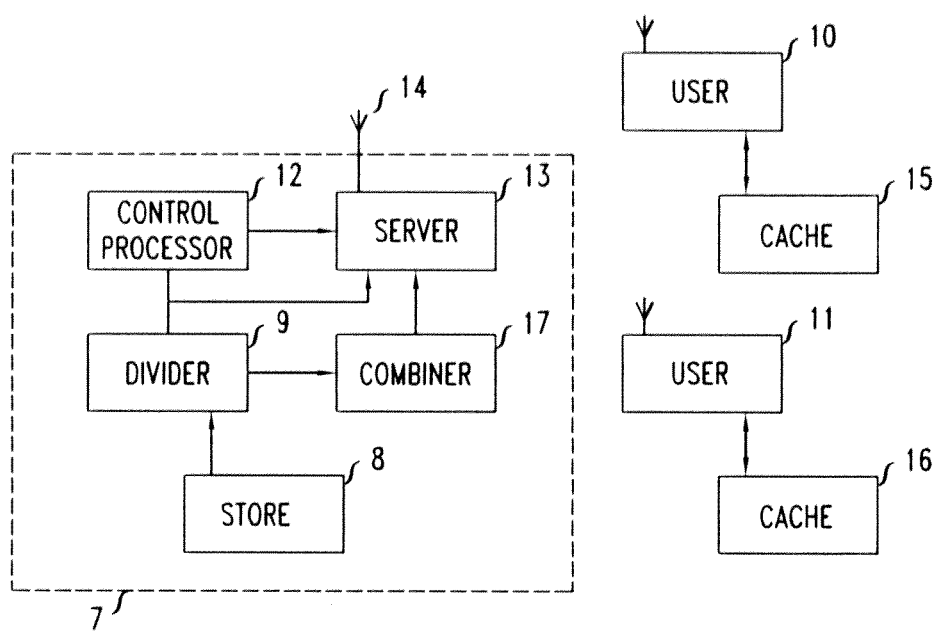
FIG. 3 schematically illustrates an apparatus for implementing the method of FIG. 1.

With reference to FIG. 3, a data transmission manager 7 for implementing the embodiment described with reference to FIG. 1 includes a content store 8 which holds data files A and B. A divider 9 accesses the content store 8 to obtain the data files A and B and divides the files into segments. Some of the segments are to be transmitted to users 10 and 11 at a time when network capacity is large and/or resources required are not expensive. Those segments to be initially transmitted to the users 10 and 11 are selected by a control processor 12 which also maintains a record of which segments are transmitted. The control processor 12 instructs a server 13 as to which segment is to be transmitted to which user. The server 13 acquires the relevant segments and sends them via transmitter 14 to the users 10 and 11 over a network. The users 10 and 11 each have an associated memory cache 15 and 16 respectively in which to store the data segments sent to them from a server 11. Each user receives segments from file A and also from file B.

When the users 10 and 11 wish to have a complete file A or B, they send a message to the server 13 over the network. The server 13 and control processor 12 determine what combined segment is required to fulfill the users requests. The combined segment is produced from file segments by combiner 17 and delivered via server 13 to the users 10 and 11. The users 10 and 11 are then able to reconstitute the complete files using the previously transmitted segments and the combined segment.

The apparatus illustrated in FIG. 3 may be adapted to perform more complex data file delivery to implement other methods as set out above.

The functions of the various elements shown in the figure, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method for managing transmission of data files to users, comprising:
   dividing a first file into a plurality of first segments;
   dividing a second file into a plurality of second segments, wherein the first and second files are different files;
   sending a select first segment from a data transmission manager to a first user device and a different first segment from the data transmission manager to a second user device;
   sending a select second segment from the data transmission manager to the first user device and a different second segment from the data transmission manager to the second user device;
   combining at least part of the select first segment or the select second segment sent to the first user device with at least part of the different first segment or the different second segment sent to the second user device to produce a combined segment which is of smaller size than the total size of the at least parts before combining; and
   transmitting the combined segment from the data transmission manager to the first user device and to the second user device;
   wherein the combined segment allows the first user device to recover the at least part of the different first segment or the different second segment sent to the second user device using the combined segment, the select first segment, and the select second segment sent to the first user device;
   wherein the combined segment allows the second user device to recover the at least part of the select first segment or the select second segment sent to the first user device using the combined segment, the different first segment, and the different second segment sent to the second user device.

2. The method as claimed in claim 1 wherein the at least part of the select first segment or the select second segment sent to the first user device is combined with the at least part of the different first segment or the different second segment sent to the second user device using addition in a finite field.

3. The method as claimed in claim 1 wherein the select and different first segments and the select and different second segments sent to the first and second user devices are sent prior to the combined segment being sent to the first and second user devices.

4. The method as claimed in claim 3 wherein the first user device is configured to store the select first segment and the select second segment sent to the first user device at a first cache memory local to the first user device;
   wherein the second user device is configured to store the different first segment and the different second segment sent to the second user device at a second cache memory local to the second user device.

5. The method as claimed in claim 1 and including
   dividing a larger segment of the select first segment or the select second segment and the different first segment or the different second segment associated with the combining into first and second parts prior to the combining;
   in conjunction with the combining, incorporating the first part of the larger segment into the combined segment along with a smaller segment of the select first segment or the select second segment and the different first segment or the different second segment associated with the combining; and
   transmitting the second part of the larger segment to the first and second user devices.

6. The method as claimed in claim 5 and including
   transmitting the second part of the larger segment to the first and second user devices with the combined segment;
   wherein the second part of the larger segment and the combined segment allow the first user device to recover the different first segment or the different second segment sent to the second user device using the combined segment, the second part of the larger segment, the select first segment, and the select second segment sent to the first user device;
   wherein the second part of the larger segment and the combined segment allow the second user device to recover the select first segment or the select second segment sent to the first user device using the combined segment, the second part of the larger segment, the different first segment, and the different second segment sent to the second user device.

7. The method as claimed in claim 1 and including
   choosing a size of the first segments and a size of the second segments to minimize an average transmission rate.

8. The method as claimed in claim 1 and including
   using a probability that the first file and the second file will be required by the first user device and/or the second user device in optimizing a size of the first segments and a size of the second segments.

9. The method as claimed in claim 1 wherein the first user device is configured to reconstitute at least a portion of the first file using the select first segment and the different first segment recovered via the combined segment;
   wherein the second user device is configured to reconstitute at least a portion of the second file using the different second segment and the select second segment recovered via the combined segment.

10. The method as claimed in claim 1 and including, where there are f files, including the first and second files, to be divided and K user devices, including the first and second user devices,
    partitioning each of the f files into 2 to the power of K segments, wherein, for each subset of user devices, there is a common segment which is saved on all of the user devices in that subset.

11. The method as claimed in claim 10 and including optimizing a size of the segments to minimize at least one of:
    an average transmission load;
    a maximum transmission load; or
    another function of the transmission load.

12. Data transmission manager for managing transmission of data files to users, comprising:
    a divider configured to divide a first file into a plurality of first segments and configured to divide a second file into a plurality of second segments, wherein the first and second files are different files;
    a transmitter configured to send a select first segment to a first user device and a different first segment to a second user device, and configured to send a select second segment to the first user device and a different second segment to the second user device; and
    a combiner configured to combine at least part of the select first segment or the select second segment sent to the first user device with at least part of the different first segment or the different second segment sent to the second user device to produce a combined segment which is of smaller size than the total size of the at least parts before combining;

wherein said transmitter is also configured to send the combined segment to the first user device and to the second user device;

wherein the combined segment allows the first user device to recover the at least part of the different first segment or the different second segment sent to the second user device using the combined segment, the select first segment, and the select second segment sent to the first user device;

wherein the combined segment allows the second user device to recover the at least part of the select first segment or the select second segment sent to the first user device using the combined segment, the different first segment, and the different second segment sent to the second user device.

13. The data transmission manager as claimed in claim 12 wherein the combiner is also configured to combine the at least part of the select first segment or the select second segment sent to the first user device with the at least part of the different first segment or the different second segment sent to the second user device by using addition in a finite field.

14. The data transmission manager as claimed in claim 13 wherein the finite field is a binary field.

15. The data transmission manager as claimed in claim 12 wherein said transmitter is also configured to send the select and different first segments and the select and different second segments to the first and second user devices prior to the combined segment being sent to the first and second user devices.

16. The data transmission manager as claimed in claim 12 wherein the divider is also configured to divide a larger segment of the select first segment or the select second segment and the different first segment or different second segment associated with the combining into first and second parts prior to the combining;

wherein, in conjunction with the combining, the combiner is also configured to incorporate the first part of the larger segment into the combined segment along with a smaller segment of the select first segment or the select second segment and the different first segment or the different second segment associated with the combining;

wherein said transmitter is also configured to send the second part of the larger segment to the first and second user devices.

17. The data transmission manager as claimed in claim 16 wherein said transmitter is also configured to transmit the second part of the larger segment to the first and second user devices with the combined segment;

wherein the second part of the larger segment and the combined segment allow the first user device to recover the different first segment or the different second segment sent to the second user device using the combined segment, the second part of the larger segment, the select first segment, and the select second segment sent to the first user device;

wherein the second part of the larger segment and the combined segment allow the second user device to recover the select first segment or the select second segment sent to the first user device using the combined segment, the second part of the larger segment, the different first segment, and the different second segment sent to the second user device.

18. The data transmission manager as claimed in claim 12 and including
a processor configured to choose a size of the first segments and a size of the second segments to minimize an average transmission rate.

19. The data transmission manager as claimed in claim 12 and including
a processor configured to use a probability that the first file and the second file will be required by the first user device and/or the second user device to optimize a size of the first segments and a size of the second segments.

20. The data transmission manager as claimed in claim 12 wherein, where there are f files, including the first and second files, to be divided and K user devices, including the first and second user devices, partitioning each of the f files into 2 to the power of K segments, wherein, for each subset of user devices, there is a common segment which is saved on all of the user devices in that subset.

21. The data transmission manager as claimed in claim 20 and including
a processor configured to optimize a size of the segments to minimize at least one of:
an average transmission load;
a maximum transmission load; or
another function of the transmission load.

* * * * *